United States Patent Office

2,964,413
PREPARATION OF ALKALINE EARTH METAL TITANATES

Leon Merker, Bronx, N.Y., assignor to National Lead Company, New York, N.Y., a corporation of New Jersey No Drawing. Filed May 7, 1958, Ser. No. 733,485

2 Claims. (Cl. 106—39)

This invention relates to novel alkaline earth metal titanate compositions of matter especially adapted for use as dielectric material or as a starting material for the preparation of single crystals of alkaline earth metal titanates.

In preparation of single crystals or dielectric material in general, it is necessary to employ a raw material which conforms to necessary requirements, such as for example, purity and particle size. In preparing the various raw materials for making single crystals it is difficult to obtain the high quality demanded.

Alkaline earth metal titanates have been prepared heretofore by calcining a mixture of titanium dioxide and alkaline earth metal carbonate at elevated temperature. The type of titanate produced by this method, however, is not of sufficient purity nor of the requisite particle size to be used as raw material for single crystal production.

Recently alkaline earth metal titanates suitable for the production of single crystals have been produced from the corresponding oxalates. However, these oxalates are usually highly acidic having a pH of less than 1. This presents serious difficulties when attempting to modify or develop the properties of the titanates by the use of addition agents, and in particular the rare earth metals, which are highly soluble in strong acids. It is desirable, therefore, to prepare alkaline earth metal titanates from titanium solutions and in particular titanium solutions of low acidity.

An object of this invention, therefore, is to provide an improved alkaline earth metal titanate composition capable of being used as raw material in forming titanate single crystals, dielectrics, etc. A further object is to provide a simple method for producing an alkaline earth metal titanium solution of low acidity for use in the production of high quality alkaline earth metal titanate compositions. Another object is to provide a method for producing rare earth metal modified titanates of an alkaline earth metal or mixtures thereof. These and other objects will become apparent from the following more complete description of the present invention.

In its broadest aspects this invention contemplates superior finely divided alkaline earth metal titanates of a character adapted for the manufacture of dielectrics and single crystals; and an improved method for making the same in which aqueous solutions of a titanium halide, an alkaline earth metal compound and a salt of tartaric acid, respectively, are reacted by heating to an elevated temperature to form a precipitate which, as indicated by the stoichiometry of the final product and X-ray diffraction patterns, is an alkaline earth metal titanium tartrate; and then calcining the precipitate to destroy the tartrate values and form an alkaline earth metal titanate. This invention further contemplates the preparation of mixed alkaline earth metal titanates as for example, barium and strontium titanates, by calcining an admixture of barium titanium tartrate and strontium titanium tartrate; and also alkaline earth metal titanates modified by the addition of rare earth metals.

The respective solutions may be admixed in any order to precipitate the alkaline earth metal titanium tartrate which is washed thoroughly with distilled water prior to calcination.

The temperatures used in calcining the precipitated, washed alkaline earth metal titanium tartrates are not critical it being only necessary to employ temperatures sufficiently high to substantially completely destroy the tartrate values and it has been found that a temperature as low as about 600° C. will destroy the tartrate values.

As mentioned above the order of addition of the respective constituents is not critical to the success of the method. However, a procedure found to be most satisfactory involves first reacting a halide of tetravalent titanium, as for example an aqueous solution of titanium tetrachloride, with an aqueous solution of ammonium tartrate to form a titanium tartrate solution to which is then added an aqueous solution of alkaline earth metal halide. The admixed solutions are then heated to a temperature from about 50° C. to as high as 80° C. to accelerate the reaction and form and precipitate the alkaline earth metal titanium tartrate. After thoroughly washing the precipitate in distilled water until the filtrate is substantially free of halide values the precipitate is then calcined at a temperature sufficient to destroy the tartrate values. A soft calcined product is obtained and when screened through a 100 mesh screen possesses good free-flowing properties. Such material is readily adaptable for the manufacture of either titanate dielectrics or single crystals.

Pursuant to further objects of the invention small quantities of modifying agents may be added to the solutions prior to precipitation of the alkaline earth metal titanium tartrate in order to produce certain desired characteristics in the final product. As mentioned at the outset, the use of a tartrate and, in particular, ammonium tartrate in lieu of tartaric acid or oxalic acid, insures the production of alkaline earth metal titanium tartrate solutions of relatively high pH value. As a consequence, modifying agents such as the rare earth metals, which would be highly soluble in strong acid solutions and hence rendered ineffective, may be successfully added to the weak acid tartrate solutions of this invention to alter the physical and/or electrical properties of the product titanate.

In order to more fully illustrate the instant invention, the following examples are presented:

EXAMPLE 1

*Preparation of barium titanate from barium titanium tartrate*

In order to prepare barium titanate the following procedure was used: Cut titanium tetrachloride solution was added to an ammonium tartrate solution during agitation. To this solution was added an aqueous solution of barium chloride. The mixture was heated to a temperature of about 80° C. to accelerate the reaction. A fine precipitate of barium titanium tartrate formed which was recovered by filtration, washed free of chlorides and then calcined to produce barium titanate.

The titanium tetrachloride solution was prepared by slowly adding substantially pure titanium tetrachloride to distilled water. 2000 parts of distilled water were placed in a tank equipped with an agitator and cooling coils. 1000 parts of titanium tetrachloride were slowly added to the distilled water over a one hour period. The temperature during the titanium tetrachloride addition was held below 36° C. and at the end of titanium tetrachloride addition the solution was perfectly clear and free from hydrolyzed $TiO_2$. The solution was then cooled to room temperature. The solution contained about 180 grams per liter of titanium calculated as $TiO_2$.

The ammonium tartrate solution was prepared by dissolving ammonium tartrate crystals in distilled water. 55.2 grams of Reagent Grade ammonium tartrate $(NH_4)_2C_4H_4O_6$ were added to 200 ml. of distilled water. The mixture was heated to 80° C. to decrease the dissolving time.

A solution of barium chloride was prepared by dissolving 24.4 grams of Reagent Grade barium chloride $(BaCl_2 \cdot 2H_2O)$ in 150 ml. of distilled water. The mixture was heated to 80° C. to speed up the solubilization.

43.9 ml. of cut titanium tetrachloride (equivalent to 8.0 grams of $TiO_2$) was added to the ammonium tartrate solution during which time the mixture was constantly agitated. To this mixture was added the barium chloride solution, the temperature of the mixed solutions then being about 76° C. Immediately a fine precipitate of barium titanium tartrate formed. The resulting slurry was agitated continuously overnight and then filtered on a vacuum filter and washed with cold water until the wash water was free of chlorides. The filter cake was then air dried for a half hour and calcined for two hours at 1000° C. to destroy the tartrate values and form barium titanate. The calcined material weighed 15.8 grams which represents a 67.7% recovery of titanium values. An X-ray analysis of the titanate showed 100% of barium titanate ($BaTiO_3$). A sample of the tartrate slurry prior to filtration was tested and had a pH value of 2.1.

A barium titanate crystal was prepared by the flame fusion method from the barium titanate produced by this example.

EXAMPLE 2

*Preparation of strontium titanate from strontium titanium tartrate*

The same general procedure was used in this example as that described in Example 1 except strontium chloride was used in place of barium chloride.

The cut titanium tetrachloride solution was prepared in the same manner as described in Example 1.

The ammonium tartrate solution was prepared by dissolving 55.2 grams of Reagent Grade ammonium tartrate in 500 ml. distilled water and the mixture was heated to 80° C.

A solution of strontium chloride was prepared by dissolving 26.7 grams of Reagent Grade strontium chloride $(SrCl_2 \cdot 6H_2O)$ in 200 ml. of distilled water. The mixture was heated to 50° C. to speed up the solubilization.

The cut titanium tetrachloride solution was added to the ammonium tartrate solution at 50° C. during agitation to which mixture was added the strontium chloride solution. A heavy white precipitate of strontium titanium tartrate was formed. This was processed, filtered and washed using the method described in Example 1.

The dried precipitate was then calcined at 1000° C. for 2 hours to destroy the tartrate values and to form strontium titanate.

The calcined material weighed 8.6 grams which represents 46.7% recovery of the titanium and strontium values. An X-ray of the final product showed a pattern indicative of 90% strontium titanate. A sample of the tartrate slurry, prior to filtration, was tested and found to have a pH of 2.3. The product was satisfactory for preparation of single crystal strontium titanate. The physical characteristics of this strontium titanate material were similar to the barium titanate described in Example 1.

EXAMPLE 3

*Preparation of calcium titanate from calcium titanium tartrate*

An aqueous solution of titanium tetrachloride and a solution of ammonium tartrate were prepared according to the procedure described in Example 1.

A solution of calcium chloride was prepared by dissolving 14.7 grams of Reagent Grade calcium chloride $(CaCl_2 \cdot 2H_2O)$ in 200 milliliters of distilled water. The temperature of the solution rose to 31° C.

The cut titanium tetrachloride solution was added to the ammonium tartrate solution during which time the mixture was constantly agitated. To this mixture was added the calcium chloride solution, the temperature of the resulting mixture being about 47° C. Immediately a fine precipitate of calcium titanium tartrate formed. The resulting slurry was agitated continuously for about 16 hours, filtered in a vacuum filter, and washed with cold water until the wash water was free of chlorides. The filter cake was then air dried for a half hour and calcined for 2 hours at 1000° C. to destroy the tartrate values and form calcium titanate. The calcined material weighed 5.0 grams which represented a 36.8% recovery of titanium values. An X-ray analysis of the titanate showed about 85% calcium titanate ($CaTiO_3$). A sample of the tartrate slurry was tested prior to filtration and had a pH of 2.2.

A single calcium titanate crystal was prepared by the flame fusion method from the calcium titanate produced in this example.

EXAMPLE 4

*Preparation of mixed barium and strontium titanates*

The same general procedure was used in this example as that described in Example 1 except a mixture of strontium chloride and barium chloride was used in place of barium chloride.

The mixture of barium and strontium chloride solution was prepared by dissolving 19.5 grams of $BaCl_2 \cdot 2H_2O$ and 5.6 grams of $SrCl_2 \cdot 6H_2O$ in 200 ml. of water at 80° C.

The mixture of barium and strontium chloride solution was added rapidly to the admixed solutions of cut titanium tetrachloride and ammonium tartrate solution at 80° C. thereby forming a heavy white precipitate of barium and strontium titanium tartrate which was processed, filtered and washed according to the method described in Example 1. The dried precipitate was then calcined at 1000° C. for two hours to destroy the tartrate values to form the mixed barium and strontium titanate. An X-ray examination of the final product showed a solid solution of barium and strontium titanate.

Although the procedure set forth in the above examples is characterized by admixing aqueous solutions of titanium tetrachloride and ammonium tartrate and then adding an alkaline earth metal chloride thereto to form an alkaline earth metal titanium tartrate slurry, it is also within the purview of the invention to combine the constituents by first reacting the titanium tetrachloride, as an aqueous solution, with a solution of an alkaline earth metal chloride and then adding this admixture to an aqueous solution of ammonium tartrate to form and precipitate the alkaline earth metal titanium tartrate. This alkaline earth metal titanium tartrate slurry may then be filtered to recover the precipitated tartrate which is then calcined to form the alkaline earth metal titanate.

By way of illustrating the differences in pH values of an alkaline earth metal titanium tartrate slurry and an alkaline earth metal titanium oxalate slurry, a series of tests were made following the procedures set out in the examples above for both types of slurries. The results are shown in the table below.

TABLE

[pH Values]

|  | Oxalate Slurry | Tartrate Slurry | Tartrate Slurry Range |
| --- | --- | --- | --- |
| Ba | <1 | 2.1 | 2.1–3.2 |
| Sr | <1 | 2.3 | 2.3–3.0 |
| Ca | <1 | 2.2 | 2.2–2.9 |

From the results shown in the above table, it is evident that the alkaline earth metal titanium tartrate slurries have higher pH values than solutions prepared with the use of oxalic acid. The relatively weak acid tartrate solutions prepared in accordance with this invention are, therefore, ideally suited to preparation of alkaline earth metal titanium titanates modified by the addition to the tartrate solution of rare earth metals and similar agents which are highly soluble in strong acid solutions. A typical use of the weak acid tartrate solutions of this invention in conjunction with a rare earth metal addition agent is illustrated by the following example.

EXAMPLE 5

*Preparation of barium titanate containing lanthanum*

The same general procedure was used in this example as that described in Example 1 except a mixture of barium chloride and lanthanum chloride was used in place of barium chloride.

The mixture of barium and lanthanum chlorides was prepared by dissolving 24.4 grams of $BaCl_2 \cdot 2H_2O$ and 0.7428 gram of $LaCl_3 \cdot 7H_2O$ in 200 ml. of water at 80° C.

The mixture of barium and lanthanum chlorides was added rapidly to the admixed solutions of cut titanium tetrachloride and ammonium tartrate solution at 80° C. thereby forming a heavy white precipitate of barium titanium tartrate containing coprecipitated lanthanum which was processed, filtered and washed according to the method described in Example 1. The dried precipitate was then calcined at 1000° C. for 2 hours to destroy the tartrate values. An excellent yield of a compound comprising barium titanate and lanthanum, having the formula $(Ba_{.98}La_{.02})TiO_3$, was formed.

In order to be useful, particularly for the manufacture of single crystals titanates must possess good free-flowing properties, low bulk density, small individual particle size, and substantially all of the particles in aggregated form. The titanates produced by this process have all the aforesaid characteristics as are essential in a material to be employed for the manufacture of dielectrics and particularly single crystals.

While this invention has been described and illustrated by the examples shown, it is not intended to be strictly limited thereto and other modifications and variations may be employed within the scope of the following claims.

I claim:
1. A method for the preparation of finely divided alkaline earth metal titanate containing a rare earth metal which comprises admixing aqueous solutions of titanium tetrachloride, ammonium tartrate and an alkaline earth metal chloride to form a slurry comprising an alkaline earth metal titanium tartrate precipitate, adding a rare earth metal to said slurry, filtering said slurry to separate and recover said precipitate, and calcining said precipitate at elevated temperatures to destroy the tartrate values and form a compound comprising an alkaline earth metal titanate and a rare earth metal.

2. A method for the preparation of a finely divided alkaline earth metal titanate containing a rare earth metal according to claim 1 in which the rare earth metal is lanthanum.

References Cited in the file of this patent

UNITED STATES PATENTS

| | | |
|---|---|---|
| 2,695,240 | Oshry | Nov. 23, 1954 |
| 2,743,295 | Khapproth | Apr. 24, 1956 |
| 2,758,911 | Lynd et al. | Aug. 14, 1956 |
| 2,812,234 | Robinson | Nov. 15, 1957 |